United States Patent

[11] 3,542,390

[72] Inventor Tyman H. Fikse
  Enumclaw, Washington
[21] Appl. No. 758,517
[22] Filed Sept. 9, 1968
[45] Patented Nov. 24, 1970
[73] Assignee Page & Page, a division of Dura Corporation
  Oak Park, New York
  a corporation of New York

[54] TRAILER WITH REAR WHEEL STEERING SYSTEM
  6 Claims, 2 Drawing Figs.

[52] U.S. Cl. .................................. 280/81, 280/423
[51] Int. Cl. .................................. B62d 53/06
[50] Field of Search ........................ 280/81, 81(.1), 426, 408, 423

[56] References Cited
UNITED STATES PATENTS
1,996,695 4/1935 Bigley ..................... 280/144
2,433,269 12/1947 Fellabaum ................ 280/426
2,772,892 12/1956 Hake ....................... 280/408X
3,284,094 11/1966 Grace ...................... 280/81.1
3,318,613 5/1967 House ...................... 280/81.1
3,339,942 9/1967 Ratkovich ................. 280/423(A)
3,438,652 4/1969 Hoffacker ................. 280/423

FOREIGN PATENTS
1,446,209 6/1966 France ..................... 280/426
964,713 7/1964 Great Britain ............ 280/81(.1)
563,747 6/1957 Italy ....................... 280/81(.1)

Primary Examiner—Leo Friaglia
Attorney—Kolisch & Hartwell

ABSTRACT: A trailer adapted to be drawn by a hauling unit including a forward and a rear set of opposed lateral support wheels supporting the rear end of the trailer. Each set of opposed lateral support wheels are steerable, and on the trailer making a turn, the rear set are angularly displaced to a greater degree than the forward set. The forward and rear set of opposed lateral support wheels are each supported on a separate dolly and on the trailer making a turn, the two dollies are swung to opposite sides of the longitudinal axis of the trailer.

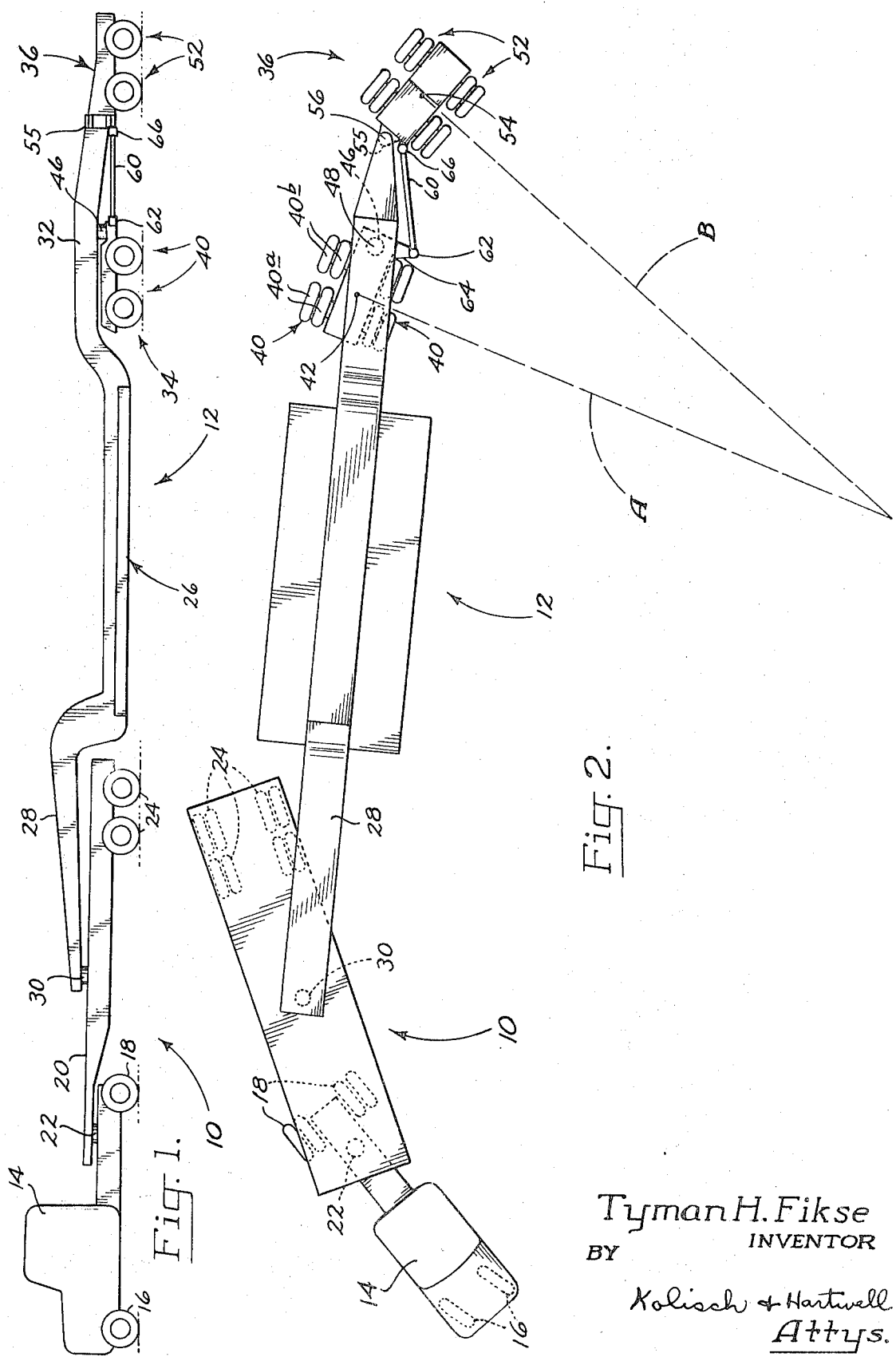

TRAILER WITH REAR WHEEL STEERING SYSTEM

This invention relates to a trailer construction, and more particularly to a trailer including a forward and a rear set of opposed lateral support wheels supporting the rear end of the trailer which are steerable to facilitate the trailer making a turn.

The invention is particularly applicable to the construction of trailers having considerable length, where it is desirable that the rear end of a trailer approximately track the unit hauling it when the trailer negotiates a curve. In this way the width of the lane which is taken up by a trailer during a turn may be substantially minimized. As a corollary, with a given size lane, and if the trailer is provided with steerable rear wheels, trailers of greater length can be handled.

A general object of this invention is to provide an improved trailer construction featuring a forward and a rear set of opposed lateral support wheels for supporting the rear end of the trailer, and novel means for steering such wheels whereby the rear end of the trailer more closely follows the forward end on the trailer making a turn.

In the turning of a vehicle, there is the additional problem of providing proper lateral support for the trailer to inhibit tipping over of the trailer and any load that it may carry. A further feature and object of the invention is the provision of a novel trailer construction with a steerable forward set and a steerable rear set of opposed lateral support wheels supporting the rear of the trailer, where the forward and rear sets of wheels swing to become offset opposite sides of the longitudinal axis of the trailer on a turn. This is a feature contributing to lateral stability.

A further feature and object of the invention is a vehicle combination where the forward extremity of the trailer is coupled with a hauling unit at a point located forwardly of its rear wheels, and the rear extremity of the trailer is supported by forward and rear sets of opposed lateral support wheels which swing to opposite sides of the longitudinal axis of the trailer on the vehicle combination making a turn. With the vehicle combination contemplated, on a turn being negotiated, both forward and rear extremities of the trailer are supported by sets of opposed lateral support wheels offset toward opposite sides of the longitudinal axis of the trailer.

Yet another object of the invention is the provision of a novel trailer construction which includes a forward and a rear set of steerable wheels supporting the rear extremity of the trailer, where both sets of wheels are angularly displaced while negotiating a turn. Additionally, the angular displacement of the rear set of wheels is somewhat greater than the forward set. In this way, a turning arc is produced for the rear extremity of the trailer which is about a center located laterally of the trailer and well forwardly of the rear extremity of the trailer.

Yet another object of the invention is to provide a reliable steering construction for the wheels supporting the rear end of a trailer, which is relatively simple and provides a steering action without the necessity for a connection with wheels or other components supporting the forward end of the trailer. The steering action is a function of an interconnection between a forward and a rear set of opposed lateral support wheels supporting the rear end of the trailer, with steering taking place on the frame of the trailer becoming relatively angularly displaced as the result of the forward end thereof being swung on the trailer negotiating a turn.

These and other objects and advantages are attained by the invention, and the same is described hereinbelow in conjunction with the accompanying drawings, wherein:

FIG. 1 is a side elevation, somewhat simplified, of a vehicle combination including an elongated trailer with such supported by steerable wheels at the rear extremity of the trailer, as contemplated by an embodiment of the invention; and FIG. 2 is a somewhat simplified plan view of the vehicle combination illustrated in FIG. 1, showing the vehicle combination in the process of negotiating a turn.

As already briefly indicated above, the invention is particularly useful in conjunction with trailers of considerable length, where it is desirable to minimize the lane taken up by the trailer during a turn by steering the rear wheels so that the rear end moves in an arc somewhat corresponding to the arc taken by the front of the trailer. Such a trailer might be used in the handling of loads having considerable length, or in the handling of loads of considerable mass where highway weight limitations require a certain axle spread between wheel assemblies supporting the trailer. It should be understood, however, that by suggesting certain uses of the vehicle, it is not intended to be limited to any specific use, as it is the structural interrelationship of the elements particularly as set forth in the appended claims which constitute the invention.

The vehicle combination illustrated in the drawings comprises what is referred to herein as a hauling unit 10, and a trailer 12 trailing the hauling unit.

The hauling unit, in the embodiment of the invention shown, comprises a truck or tractor 14 which includes the usual prime mover and which is supported at its forward end by dirigible wheels 16. Shown at the rear of the tractor are a set of opposed lateral support wheels 18 which are connected for driving purposes in the usual manner to the prime mover in the tractor.

Hauling unit 10 in the particular embodiment of the invention shown further comprises a trailer section, shown at 20. The trailer section is coupled, as by the usual fifth wheel mechanism 22, to the frame of the tractor, with the fifth wheel mechanism permitting relative lateral swinging of the trailer section about a vertical axis. Supporting the rear of the trailer section for movement over the ground are a set of opposed lateral support assemblies 24.

Trailer 12 which trails the hauling unit, includes the usual trailer frame 26 which midway between the ends of the trailer forms a bed for the trailer. A gooseneck 28 at the forward extremity of the trailer frame is coupled by fifth wheel connection 30 to trailer section 20. The fifth wheel connection accommodates relative swinging of trailer 12 about a substantially upright axis which is located forwardly of rear wheel assemblies 18 in trailer section 20. Forming the rear of trailer frame 26 is an elongated extension 32.

Rolling support for the rear of the trailer is provided by a pair of wheeled dollies, more specifically, a forward dolly shown generally at 34 and a rear dolly shown generally at 36. These are interconnected for related swinging, as will now be described in more detail.

Considering first of all the forward dolly, mounted through the usual suspension system, details of which are not shown, in load-supporting relation on the underside of the dolly, is a set of opposed lateral support wheels 40. In the particular embodiment of the invention shown, this set of wheels includes wheels on each side of the dolly arranged in tandem, as exemplified by the wheels on the right side of the dolly in FIG. 2 which include wheels 40a disposed behind and following wheels 40b. The wheels collectively in set 40 provide rolling support for the dolly, with the central point of such support being located midway between the sides of the dolly and midway between the axle structure mounting the forward wheels and the axle structure mounting the rear wheels in the set of wheels 40. This central point of support for forward dolly 34 is indicated in the drawings at 42.

A swivel means 46 mounts dolly 34 in load-supporting relation under extension 32, with the swivel means permitting swiveling of the dolly about an upright swivel axis shown generally at 48. This swivel axis is located rearwardly of the central point of support 42 provided for the dolly by the set of wheels 40. As a consequence, when the dolly swivels with respect to the trailer frame, the dolly partakes of swinging movement, and there is lateral swinging of the dolly to one side of the longitudinal axis of the trailer. The set of wheels 40 become offset to one side of the trailer.

Rear dolly 36 is somewhat similar in construction to the forward dolly. Thus, it includes a set of opposed lateral support wheels 52 which support the dolly for rolling movement over the ground. The central point of the support provided the dolly by the wheels is shown at 54. Swivel means 55 mounts the dolly, with such accommodating swiveling of the dolly about an upright swivel axis shown at 56. Swivel axis 56 of swivel means 55, in this instance, is located forwardly of the central point of support provided for the dolly by the support wheels, or point 54. Thus, with swiveling of the dolly, the dolly swings laterally of the longitudinal axis of the trailer.

According to the invention, means is provided interconnecting the two dollies supporting the rear extremity of the trailer frame, whereby when one swivels, a related swiveling takes place in the other. More specifically, this means comprises a link or bar 60 disposed generally to one side of extension 32. The forward end of the bar is pivotally joined at 62 to an arm 64 extending radially to one side of the dolly from swivel axis 48. The rear end of bar 60 is pivoted at 66 to a side of dolly 36 and at a point spaced radially from swivel axis 56. It should be known that the radial spacing of pivot 62 from swivel axis 48 somewhat exceeds the radial spacing of pivot 66 from swivel axis 56.

With the construction shown, and on the vehicle combination traveling over the highway, on turning of the vehicle combination, as illustrated in FIG. 2, forward dolly 34 becomes angularly displaced. With the turn to the left as in FIG. 2, the relative displacement is toward the right of the longitudinal axis of the trailer. The rear dolly on a left-hand turn becomes angularly displaced with displacement being to the left of the longitudinal axis of the trailer frame. The sets of wheels in the two dollies thus assume positions offset to opposite sides of the longitudinal axis of the trailer. This is important in obtaining stability. The two dollies, in combination, provide rolling support for the rear of the trailer, while defining a course for such movement which is approximately along an arc with such arc centered where lines normal to the longitudinal axes of the dollies and through their central points of support intersect on one side of the trailer. These lines have been indicated at A and B in the drawings, and it will be noted that the point where they intersect is located to one side of the trailer and well forwardly of the rear end of the trailer. While the different components of the vehicle combination illustrated will have different relative positions depending upon the sharpness of the turn, and how the turn is executed, with the rear of the trailer in the vehicle combination moving in the arc described, it should be apparent that for the usual type of turn the arcuate movement of the rear of the trailer will approximately coincide with the arcuate movement occurring at the forward end of the trailer.

The dollies described are shifted to produce the disclosed intersection of lines A and B, by reason of the fact that the link which interconnects the dollies produces a relative angular displacement of the rear dolly which exceeds the relative angular displacement of the forward dolly. More particularly, this results by reason of the fact that the ends of the link are connected to the dollies by pivots 62, 66 which have unequal radial spacings from the swivel axes of the dollies, the spacing of pivot 62 from swivel axis 48 exceeding the spacing of pivot 66 from swivel axis 56.

It should further be noted that with the hauling unit described, and with trailer 12 coupled to the hauling unit forwardly of its rear wheel assemblies, i.e. the rear wheel assemblies of trailer section 20, on the vehicle combination negotiating a turn, the forward end of trailer 12 is supported by a set of wheels 24 offset to one side of the longitudinal axis of the trailer, and a set of wheels 18 offset to the opposite side of trailer 12. This is also a contributing factor to obtaining stability.

It is recognized that in some constructions the dollies 34, 36 might be connected with the hauling unit through a detachable connection with an elongated beam or other member which constitutes the load being transported, and which with the vehicle combination assembled actually functions as the trailer frame extending between the forward and rear extremities of the trailer, there being no permanent trailer frame as such. It is not intended by this description to exclude such types of constructions, and the term "frame", therefore, as used herein, includes any member or structure extending between and functioning to hold separate forward and rear extremities of the trailer.

In the form of the invention illustrated, eight wheels are shown in connection with each dolly, with there being four on each side of the dolly and these four being arranged in tandem. It is appreciated that the number of wheels may be varied. Where a dolly has but paired wheels on either side of it, these being axially aligned, then the point located centrally of where the dolly receives support through the wheels from the ground is a point located midway between the wheels along the axis of the wheels.

The vehicle combination has been described in connection with a turn to the left, as shown in FIG. 2. Obviously, the working of the vehicle combination is similar on a right-hand turn. On completion of the turn, the trailer frame shifts in a manner producing swinging of the dollies into alignment with the trailer.

The type of steering organization disclosed is relatively simple and reliable. The construction requires, in the embodiment of the invention illustrated, no connection with the wheel structure at the forward end of the trailer.

Various modifications and variations of the invention will suggest themselves to those skilled in the art.

I claim:

1. A vehicle having a forward and a rear dolly supporting the rear end of the vehicle, swivel means mounting each of the dollies in load-supporting relation on the vehicle and accommodating swiveling of the dolly about an upright swivel axis, each dolly being swingable laterally of the vehicle by reason of the dolly's swivel axis being offset in a direction extending longitudinally of the vehicle from a point located centrally of where the dolly receives support from the ground, and means operatively interconnecting the dollies whereby, on relative swivel movement of the vehicle with respect to one dolly and the said one dolly swinging to one side of the vehicle, a related swivel movement takes place in the other dolly with said other dolly moving to the other side of the vehicle.

2. The vehicle of claim 1, wherein the swivel means mounting the forward dolly has a swivel axis disposed rearwardly of the point located centrally of where the dolly receives support from the ground, and the swivel means mounting the rear dolly has a swivel axis located forwardly of the point located centrally of where the dolly receives support from the ground.

3. The vehicle of claim 1, wherein the means interconnecting the forward and rear dollies comprises a link and said link is pivoted at a pivot point to each dolly, such pivot points being disposed radially from the swivel axes for the dollies.

4. The vehicle of claim 3, wherein the radial spacing between the swivel axis of the forward dolly and the pivot point for the forward dolly exceeds the radial spacing between the swivel axis of the rear dolly and the pivot point for the rear dolly.

5. In a vehicle combination including a hauling unit supported for movement over the ground, a trailer adapted to be drawn by the hauling unit coupled to the hauling unit, a forward and a rear dolly supporting the rear end of the trailer, a mounting for each dolly mounting it for swinging movement relative to the trailer to a position disposed laterally of the trailer, said forward dolly including a frame and wheels supporting it and the mounting for the forward dolly including swivel means accommodating swinging movement of the dolly about a swivel axis disposed rearwardly of a point located centrally of where the dolly receives support through such wheels from the ground, and means operatively interconnecting the dollies at the rear end of the trailer whereby one swings to one side and the other swings to the other side of the longitudinal axis of the trailer on the vehicle rounding a turn with the two dollies then supporting said rear end for movement in a course extending at an angle to the longitudinal axis of the trailer.

6. A vehicle having a forward and a rear dolly supporting the rear end of the vehicle, swivel means mounting each of the dollies in load-supporting relation on the vehicle and accommodating swiveling of the dolly about an upright swivel axis, the swivel means mounting the forward dolly providing a swivel axis which is offset rearwardly of the point located centrally of where the dolly receives support from the ground and the swivel means mounting the rear dolly providing a swivel axis which is offset forwardly of the point located centrally of where the rear dolly receives support from the ground, each dolly being swingable laterally of the vehicle by reason of such offset in the swivel axis of the dolly, means interconnecting the forward and rear dollies comprising a link extending in a generally longitudinal direction and disposed to one side of the longitudinal axis of the vehicle, said link being pivotally joined to the forward and rear dollies at points disposed radially from the swivel axes for the dollies, the radial spacing between the swivel axis of the forward dolly and the pivot point for the forward dolly exceeding the radial spacing between the swivel axis of the rear dolly and the pivot point for the rear dolly.